Figures 1, 2:
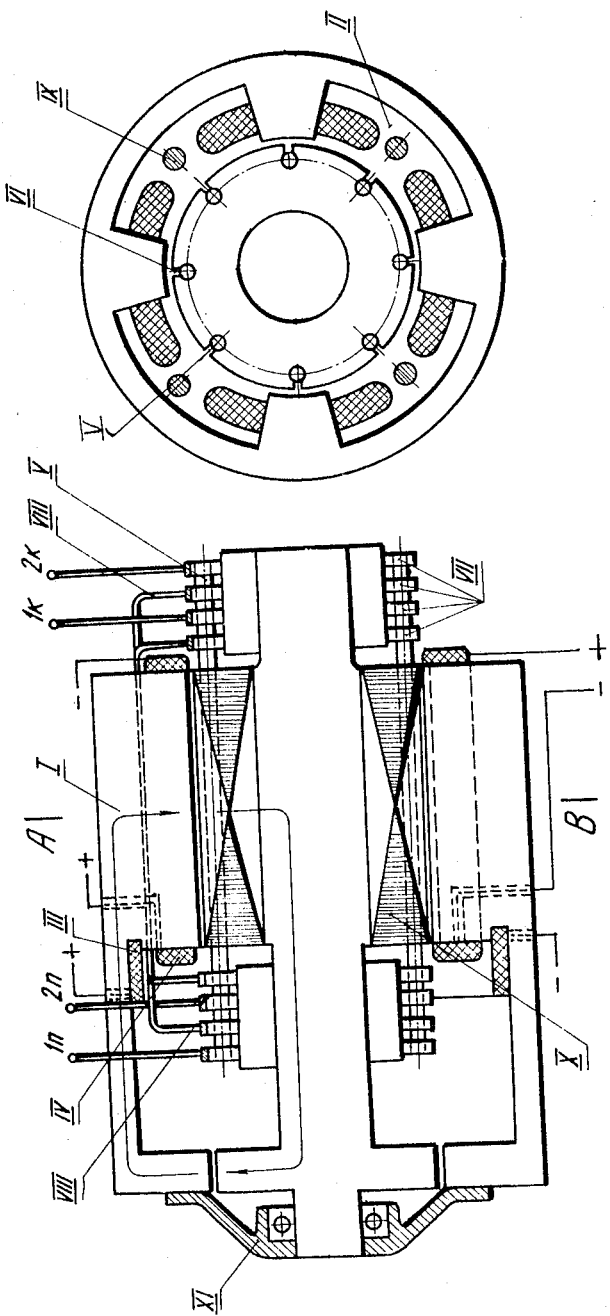

Dec. 27, 1966    I. S. ROGACHEV ETAL    3,294,996
ELECTRICAL ROTARY-MACHINE UNIPOLAR IMPULSE
VOLTAGE GENERATOR

Filed May 19, 1961                           3 Sheets-Sheet 1

United States Patent Office 3,294,996
Patented Dec. 27, 1966

3,294,996
ELECTRICAL ROTARY-MACHINE UNIPOLAR IMPULSE VOLTAGE GENERATOR
Ivan Sergueevich Rogachev, 15 Frunze Str., Apt. 4, Kharkov, U.S.S.R.; Abram Lazarevich Livshits, 5th Verkhne-Michailovsky Proezd 28, Apt. 9, Moscow, U.S.S.R.; and Lev Davydovich Perchik, 19 Lermontovskaya Str., Apt. 11, Kharkov, U.S.S.R.
Filed May 19, 1961, Ser. No. 136,378
2 Claims. (Cl. 310—179)

The present invention relates to the electrical rotary-machine unipolar impulse voltage generator.

In recent years in many fields of engineering wide use has been made of impulse methods of supply, characterized by the intermittent delivery of separate pulses of energy.

Impulse methods, in particular, have found application in electrical engineering in the power-current class of equipment in impulse and stored-energy electric welding, in electro-erosion methods of metal working, etc.

The development of the energy-producing, chemical and other branches of machine building which employ metals and alloys that are difficult to work by means of conventional methods, as well as the manufacture of technological accessories for pressure casting, stamping presses, and metallo-ceramic and plastic moulding, which require the making of parts of intricate configuration, creates the need for universal advancement and wider application of the electro-erosion metal working method.

The latter, to a considerable extent, has been retarded by the absence of a sufficiently rational source of supply for electro-erosion installations.

Known relaxation-type generators used in the electric spark variety of the electro-erosion metal working method do not ensure high-rate production and sufficient electrode-tool life, hence find but limited application.

Herein is proposed an original rotary-machine generator of unipolar voltage impulses the characteristics of which, "drop-off" in particular, are practically independent of the physical state of the erosion gap. The generator proposed herein makes it possible to carry out metal working at greater rates of production and with less wear of the electrode-tools than is attainable with the use of other known types of supply source.

The above specific characteristics of the proposed generator provide the possibility for working metals with unipolar spark impulses of large duration and thus achieve a highly effective electrical-impulse variety of the electro-erosion metal working method.

The low cost of the generator, in combination with reliability in operation and simplicity of maintenance, are factors on the basis of which the generator may be considered as a more rational source of power supply in comparison with other supply sources for electro-erosion installations.

This proposed electrical rotary-machine generator is a new type of electrical machine which makes possible the obtainment of unipolar voltage impulses either directly from the generator proper, or by rectification of an alternating impulse voltage developed in the generator.

The impulse character of the generator voltage is attained by building the magnetic system so that the magnetic flux in the air gap varies around the generator armature, thus providing the E.M.F.'s induced in the armature conductors with an impulse character.

The herein proposed unipolar voltage impulse generator may be built either single-phase or polyphase.

Figure 5:
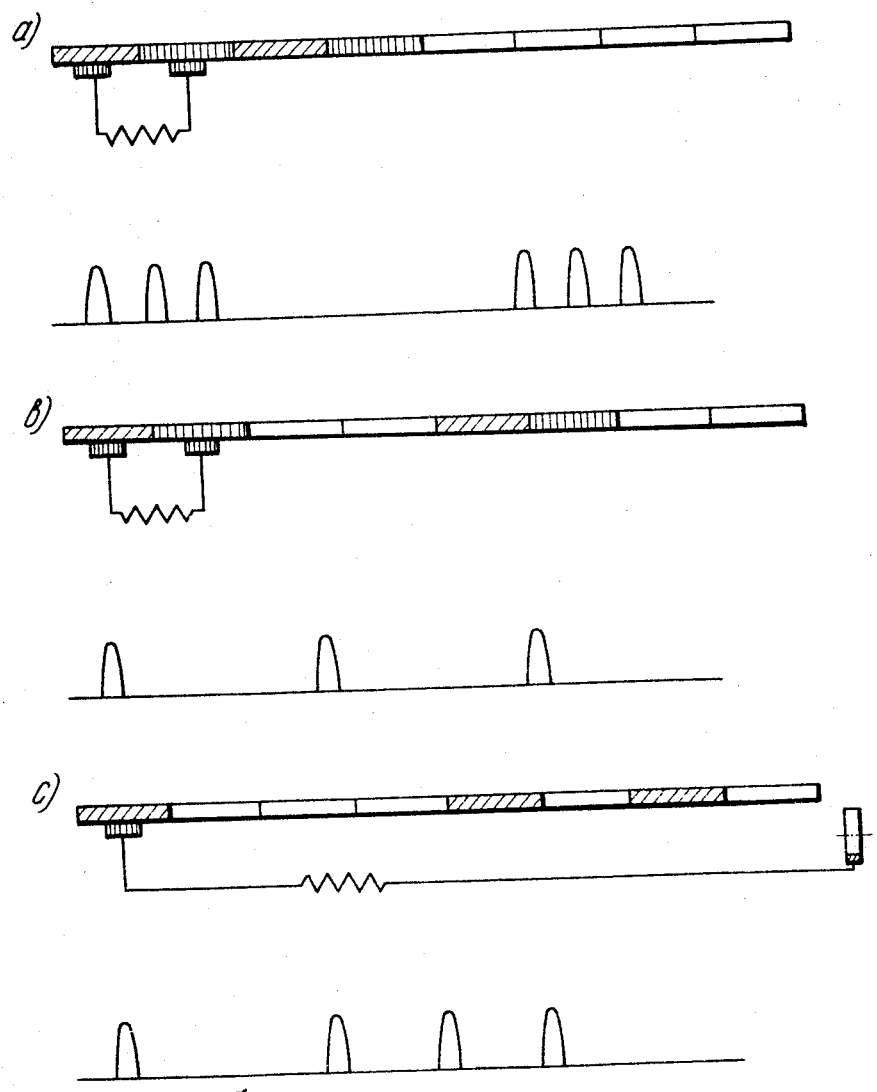
Figure 3:
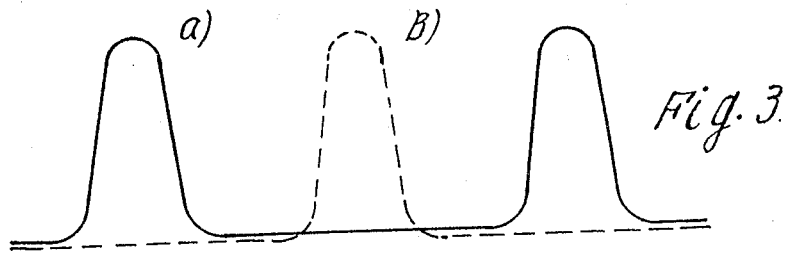
Figure 4:
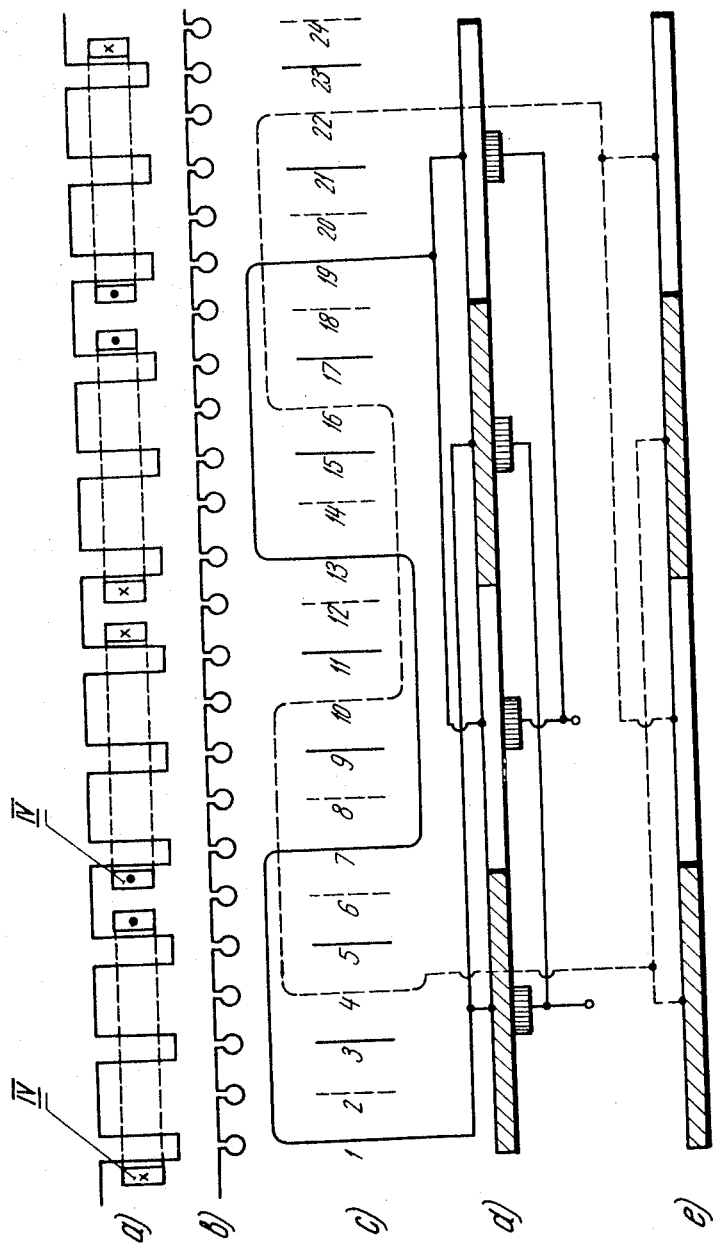

Schematically shown in FIG. 1 is a longitudinal cross section, and in FIG. 2 (through line A–B), a transverse cross section of the proposed generator with a two-phase winding; in FIG. 3 are shown curves of the voltages taken off at the brushes of both phases; FIG. 4 gives a schematic circuit for a different alternative design; while FIG. 5 shows how the impulse sequence depends upon the way in which the commutator connections are made.

As may be seen in FIGS. 1 and 2, frame or stator cylinder 1 of the generator is provided with open axial slots 2. In several of these slots an exciting winding is arranged and may be made in the form of a ring 3 and (or) coils 4. The insulated conductors 5 forming the armature (rotor) winding are placed in semi-closed slots 6 and, at their ends, connected to one (for parallel connection), or several (for series connection and where the induced E.M.F.'s differ in phase) pairs of slip rings 7. Slip rings 7 carry brushes from which the unipolar voltage is taken off. Series connection of conductors 5 is accomplished by accordingly interconnecting the brushes with the aid of connecting conductors 8. The latter are arranged in stator slots 9 uniformly spaced around the stator circumference thus to ensure weakening of the influence of armature reaction.

To reduce the losses in the armature, the outer part of the latter is built up of laminations 10 seated on the shaft. The diameter of the shaft should be large enough to carry the generator working flux.

The unipolar voltage taken off at the brushes, for both phases, is shown in FIG. 3 where curve "a" is the first-phase voltage of the armature winding taken off at leads $1n$ and $1k$, and curve "b" is the second-phase voltage which is taken off at leads $2n$ and $2k$. Four conductors are employed in each phase—rods connected in parallel, two each, to two pairs of rings. The minimum value of the E.M.F., when teeth of corresponding dimensions are selected, may be made sufficiently small to obtain a practically unipolar impulse voltage. To attain E.M.F.'s of a sharply defined impulse character, the width of the slot space between teeth must be larger than ⅓ of the tooth pitch (or, what is equivalent, tooth width should be less than ⅓ of the tooth pitch). It is, also, to be pointed out that the width of the poles or pole shoes is less than two-thirds (⅔) of the pitch of the poles.

In view of the fact that the entire working flux is passed through the shaft and two end bells, bearing mounting is best done in a capsule housing or in auxiliary bearing shields 11 of non-magnetic material to prevent induction of, or considerably weaken, any "bearing" currents.

The exciting winding coils laid in axial slots 2 (FIG. 2) may be uniformly distributed around the stator circumference and encircle several teeth each. They may be connected so that an alternating-pole magnetic system is created (rings 3 may not be used here).

In such an instance, E.M.F.'s of different polarity will be induced in the armature winding conductors, depending upon the position the latter occupy under one or another pole. By connecting the conductors, with E.M.F.'s of like sign at any given moment, into separate branch circuits, an alternating E.M.F. will be obtained in the armature winding when rotation of the armature takes place. Connection of the ends of the above branch circuits to the bars of a commutator, the number of bars of which being equal to the number of poles in the magnetic system, and every second bar of which connected together to form two systems, will allow a unipolar E.M.F. to be obtained from the commutator by means of brushes accordingly arranged on it.

Schematic diagrams of such a machine may be seen in FIG. 4–$a$ to $e$; where (a) represents the stator teeth, (b) the armature slots, (c) the armature conductors, (d) commutator $K_1$, and (e) commutator $K_2$. Each coil 4 of exciting winding encircles three teeth. The odd-number armature-winding conductors (in full lines) belong to one phase, the even-number conductors (in dotted lines)— to the other phase. Conductors 1 and 7 form one turn, and conductors 1, 7, 13 and 19 constitute one circuit branch, the ends of which are brought out to commutator $K_1$.

In the second phase conductors 4 and 10, and 16 and 22 respectively form two turns. These turns are connected in series and make up a second circuit branch the ends of which are brought out to commutator $K_2$.

A most simple case is one where the exciting winding coils encircle only one tooth each are arranged in all the axial slots. This makes each tooth a pole. The armature winding and commutators remain without change. This same generator, with its alternating-pole magnetic system, can be built with salient poles on the surfaces of which axial slots are provided. In cases where the exciting winding coils encircle only one tooth (pole) each, to reduce the number of teeth and their fastenings when the armature carries an $m$-phase winding, all the $m$-phases can be brought out to one and the same commutator, built up of $2\,pm$ bars (where $p$ is the number of pairs of poles in the magnetic system). These commutator bars are electrically connected together so that they form $m$ system uniformly arranged around the circumference. Between the adjacent bars of any one system are arranged $2m-1$ bars of the other systems. A system of brushes will be mounted on the commutator and, at any given instant of time, brushes of both polarities will be located on bars connected to one of the $m$ windings. As the armature turns, the brushes will be successively connected to windings of different phase and the impulse frequency will then equal:

$$f = 2pm/60$$

that is, will be $m$ times greater than that of a single-phase winding with the same number of poles.

Polyphase windings may be Y connected with the neutral brought out to a ring and the "start" ends of the phases connected to every other commutator bar to give half-wave rectification and halve the impulse frequency. If, in this case, all the intermdiate commutator bars are connected to each other and to the neutral, the brushes will take off a uniploar voltage with a frequency of $f = 2pm/60$ because full-wave rectification will take place.

Arrangement of magnetic shunts in the form of plates placed between the edges of adjacent teeth of different polarity will improve the impulse wave form because of the shorting of the magnetic flux which passes into the armature between poles and acts to "open" the impulse.

By coating the magnetic shunts with a layer of copper, a form of damping system is created to suppress harmful higher-harmonic influence. One of the ways of making this copper layer is to electrolytically plate the magnetic shunt plates.

Employment of a commutator as a means of rectification makes it possible to obtain various impulse-pause sequence combinations, this being achieved by providing the commutator with idle bars and additional slip rings. Several examples given in FIG. 5, characterize the principles of obtaining different impulse sequences. The commutator bars to which the ends of the winding are connected are denoted by different cross hatchings. Bars with the same cross hatching are electrically interconnected to each other; those shown without cross hatching are "idle" bars. When an 8-pole machine is connected in accordance with FIG. 5a, groups of three successive impulses followed by a pause corresponding to 5 impulses in duration will be obtained. Connection according to FIG. 5b results in a four-fold lengthening of the pause. A different impulse sequence will be obtained when the connections are as shown in FIG. 5c. By using such a method, a wide variety of sequence combinations may be obtained.

What we claim is:

1. An electric rotary machine generator for producing unidirectional voltage pulses, provided with a stationary magnetic system comprising several pairs of salient poles thereby providing a stator provided with axial slots in the pole shoes, said poles being evenly distributed along a magnet yoke periphery of said stator and each of said poles being embraced by excitation windings, said excitation windings connected to form an alternating-pole magnetic system, a laminated armature including semi-closed slots having a pitch less than the pitch of said axial slots, said armature including a polyphase winding having a pitch equal to the polar pitch of said poles, said polyphase winding being placed in said semi-closed slots under all of said magnetic system poles and connected to several commutators, each of said commutators comprising $2p$ segments ($p$ standing for the number of pole pairs in the stator magnetic system), every other of said segments being connected to form two insulated systems, said insulated systems being connected to the ends of said polyphase winding, each of said insulated systems being provided with two brush sets symmetric to said commutator segments whereby a homopolar pulse voltage is removed therefrom.

2. An electric rotary machine generator for producing unidirectional voltage pulses, provided with a stationary magnetic system comprising several pairs of salient poles and having the width of the pole shoes less than $\frac{2}{3}$ of the pitch of said poles, said poles being evenly distributed along a magnet yoke periphery, each of said poles being embraced by excitation windings, said excitation windings connected to form an alternating-pole magnetic system thereby providing a stator, a laminated armature including semi-closed slots evenly distributed along said periphery, said semi-closed slots being a multiple to the number of said poles, said armature including a single-phase winding having a pitch equal to the pitch of said poles, said single-phase winding being placed in said semi-closed slots under all of said magnetic system poles and connected to a commutator, said commutator comprises $2p$ segments ($p$ standing for the number of pole pairs of the magnetic system), every other of said segments being connected to form two insulated systems, said insulated systems being connected to the ends of said single-phase winding and are furnished with two brush sets symmetric to said commutator segments whereby a homopolar voltage is removed therefrom.

References Cited by the Examiner

UNITED STATES PATENTS

| 1,916,241 | 7/1933 | Von Platen | 321—2 |
| 2,000,161 | 5/1935 | Burgett | 321—29 |
| 2,021,164 | 11/1935 | Alm | 321—29 |
| 3,098,164 | 7/1963 | Inoue | 310—168 |

JOHN F. COUCH, *Primary Examiner.*

ROBERT C. SIMS, LLOYD McCOLLUM, *Examiners.*

G. J. BUDOCK, G. G. GOLDBERG,
*Assistant Examiners.*